Dec. 16, 1924.

A. M. GRIFFIN

VALVE

Filed June 28, 1923

1,519,832

INVENTOR
Alvah M. Griffin.
BY Arthur C. Brown
ATTORNEY

Patented Dec. 16, 1924.

1,519,832

UNITED STATES PATENT OFFICE.

ALVAH M. GRIFFIN, OF KANSAS CITY, MISSOURI, ASSIGNOR OF ONE-HALF TO ANDREW A. KRAMER, OF KANSAS CITY, MISSOURI.

VALVE.

Application filed June 28, 1923. Serial No. 648,278.

*To all whom it may concern:*

Be it known that I, ALVAH M. GRIFFIN, a citizen of the United States, residing at Kansas City, in the county of Jackson and State of Missouri, have invented certain new and useful Improvements in Valves; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to valves for closing off ported inlets and the primary object is to provide a novel form of valve seat mounting. The invention will be clearly understood by reference to the following description in connection with the accompanying drawings, in which—

Figure 1:
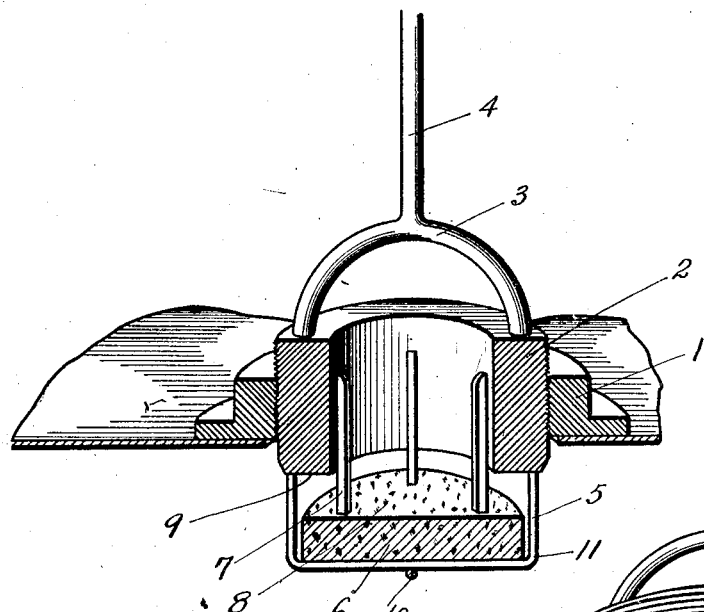
Fig. 1 is a sectional view through a valve seat and valve constructed in accordance with my invention.

Referring now to the drawings by numerals of reference:

1 designates a collar which may be secured in any appropriate manner to a ported member. The collar 1 is threaded to receive a threaded circular valve seat 2, having a yoke 3 connecting it to a stem 4. The bottom of the collar carries a valve cage 5 in which is a float valve 6 shown as a disk. The float valve is provided with upstanding guide fingers or projections 7 which slide in the circular opening of the valve seat so that the valve seat will be guided in a vertical position to insure its flat face 8 coming into contact with the flat face 9 of the valve seat or collar 2.

Figure 2:
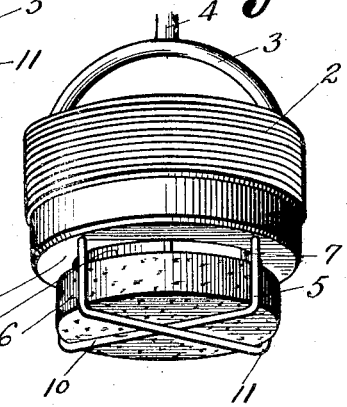
Fig. 2 is a perspective view of the same.
Figure 3:
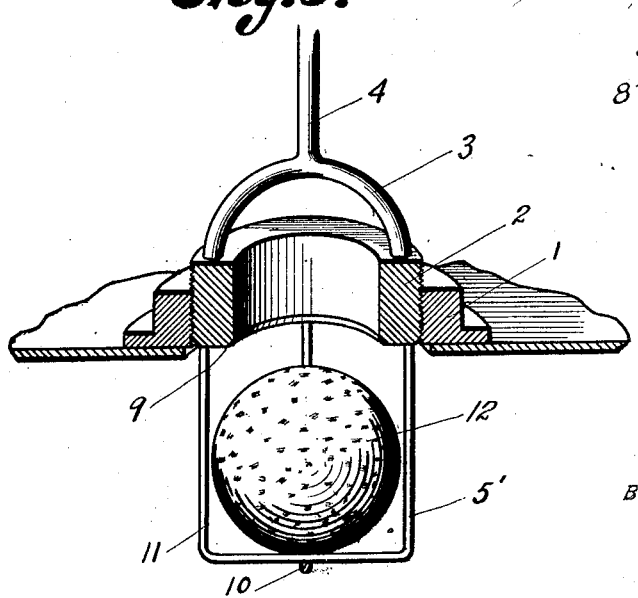
Fig. 3 is a sectional view through the valve seat showing a slightly modified form of valve.

The valve cage 5 may consist of cross wires 10 and 11 as shown in Fig. 3, and instead of a flat disk valve I may employ a spherical valve 12 in the valve cage 5'; otherwise the construction of the collar and valve seat will be similar to that shown in Figs. 1 and 2.

The construction heretofore described provides an inexpensive, simple construction of valve mechanism whereby a float valve will be caused to automatically seat and whereby liability of tilting of the disk will be eliminated.

According to the construction shown in Figs. 1 and 2 the disk must move up into engagement with the face of the valve seat each time. Therefore, when the float rises to a sufficient height, the port through the collar 2 will be closed.

What I claim and desire to secure by Letters-Patent is:

A valve mechanism comprising a threaded collar, a threaded ring in the collar having a valve seat, a cage depending from the ring, a float valve in the cage to seat upon the seat, and a stem on the valve seat whereby the valve seat can be turned in the collar.

In testimony whereof I affix my signature

ALVAH M. GRIFFIN.